United States Patent
Yano et al.

(10) Patent No.: US 8,558,721 B2
(45) Date of Patent: Oct. 15, 2013

(54) POSITION DETECTION APPARATUS, IMAGE TAKING APPARATUS AND POSITION DETECTION METHOD

(75) Inventors: Hitoshi Yano, Osaka (JP); Katsuhiro Onishi, Osaka (JP)

(73) Assignee: Sony Corporation (JP)

( * ) Notice: Subject to any disclaimer, the term of this patent is extended or adjusted under 35 U.S.C. 154(b) by 430 days.

(21) Appl. No.: 12/925,677

(22) Filed: Oct. 27, 2010

(65) Prior Publication Data

US 2011/0128396 A1    Jun. 2, 2011

(30) Foreign Application Priority Data

Nov. 27, 2009  (JP) ................ P2009-269409

(51) Int. Cl.
*H03M 1/22* (2006.01)

(52) U.S. Cl.
USPC ................. 341/11; 341/13; 341/15

(58) Field of Classification Search
USPC ............. 341/11, 13, 15; 396/133; 359/823
See application file for complete search history.

(56) References Cited

U.S. PATENT DOCUMENTS

| | | | |
|---|---|---|---|
| 5,173,693 A * | 12/1992 | Fry | 341/15 |
| 7,638,755 B2 * | 12/2009 | Ayres et al. | 250/231.13 |
| 7,801,435 B2 * | 9/2010 | Honjo et al. | 396/133 |
| 8,039,786 B2 * | 10/2011 | Kusano et al. | 250/231.13 |
| 8,136,258 B2 * | 3/2012 | Albert et al. | 33/1 PT |

FOREIGN PATENT DOCUMENTS

JP    2002-277282 A    9/2002

* cited by examiner

*Primary Examiner* — Brian Young
(74) *Attorney, Agent, or Firm* — Lerner, David, Littenberg, Krumholz & Mentlik, LLP

(57) ABSTRACT

Disclosed herein is a position detection apparatus including: a signal line along which a bit array including a plurality of bits used for expressing information on one of absolute positions in a direction determined in advance is created repeatedly in the direction determined in advance; and an information reading-out section which is capable of making a movement relative to the signal line in the direction determined in advance in accordance with a driving operation carried out by driving means determined in advance and is used for reading out the information expressed by the bits from the signal line.

7 Claims, 4 Drawing Sheets

POSITION DETECTION APPARATUS, IMAGE TAKING APPARATUS AND POSITION DETECTION METHOD

CROSS-REFERENCE TO RELATED APPLICATION

The present application claims priority from Japanese Patent Application No. JP 2009-269409 filed in the Japanese Patent Office on Nov. 27, 2009, the entire content of which is incorporated herein by reference.

BACKGROUND OF THE INVENTION

1. Field of the Invention

The present invention relates to a technology of a position detection apparatus having a signal line along which bit arrays are created in a direction determined in advance to serve as the direction of the signal line.

2. Description of the Related Art

In an image taking apparatus such as a digital camera, it is necessary to detect the position of a lens by typically execution of an AF (Auto Focus) control. In the process of detecting the position of the lens, however, an absolute-type encoder for detecting an absolute position is used. The absolute-type encoder typically detects an absolute position by carrying out parallel communications from a number of signal lines which are laid in parallel to each other.

With the absolute-type encoder, however, the resolution of the lens-position detection is determined by the number of signal lines. Thus, the absolute-type encoder raises a problem that the number of signal lines needs to be increased if a high resolution is required.

A technology disclosed in Japanese Patent Laid-Open No. 2002-277282 (hereinafter referred to as Patent Document 1) has been proposed as a technology for solving the problem described above. In accordance with the proposed technology, information on a detected absolute position is conveyed as typically serial data of 10 bits along a signal line. In this way, the number of signal lines can be sustained at a small value.

SUMMARY OF THE INVENTION

In accordance with the technology disclosed in Patent Document 1, however, information on a detected absolute position is conveyed as typically serial data of 10 bits along a signal line. Thus, position-information acquisition points on the signal line must be separated away from each other by an interval of at least 10 bits. As a result, the resolution of the lens-position detection deteriorates. It is to be noted that the position-information acquisition point is defined as a point at which information on the absolute position is to be acquired.

Addressing the problems described above, inventors of the present invention have presented a technology of a position detection apparatus which allows the number of signal lines to be reduced and is capable of preventing the resolution of the lens-position detection from deteriorating.

In accordance with a first embodiment of the present invention, there is provided a position detection apparatus employing: a signal line along which a bit array including a plurality of bits used for expressing information on one of absolute positions in a direction determined in advance is created repeatedly in the direction determined in advance; and an information reading-out section which is capable of making a movement relative to the signal line in the direction determined in advance in accordance with a driving operation carried out by a driving section determined in advance and is used for reading out the information expressed by the bits from the signal line.

Every time a pulse signal determined in advance is supplied to the driving section determined in advance, the information reading-out section is driven to move over the signal line by a distance corresponding to the pitch of the bits included in the bit array.

At an absolute-position acquisition point on the signal line, the information reading-out section reads out information expressed by a plurality of aforementioned bits included in the bit array as the information on the absolute position of the absolute-position acquisition point from the signal line.

Information on a position relative to the absolute-position acquisition point is acquired by the information reading-out section by counting the number of aforementioned pulse signals supplied to the driving section determined in advance.

In accordance with a second embodiment of the present invention, there is provided a position detection apparatus employing: a first signal line along which a first bit array including a plurality of bits used for expressing information on one of absolute positions in a direction determined in advance is created repeatedly in the direction determined in advance; a second signal line along which a second bit array associated with the first bit array is created repeatedly in the direction determined in advance; and an information reading-out section which is capable of making a movement relative to the first and second signal lines in the direction determined in advance and is used for concurrently reading out pieces of information expressed by the bits from the first and second signal lines respectively.

At an absolute-position acquisition point on the first signal line, the information reading-out section reads out information expressed by a plurality of aforementioned bits as the information on the absolute position of the absolute-position acquisition point from the first signal line.

Information on a position relative to the absolute-position acquisition point is acquired by the information reading-out section from the second signal line as a bit count obtained by counting the number of bits included in the second bit array as bits corresponding to the position relative to the absolute-position acquisition point.

The position detection apparatus provided in accordance with the first embodiment of the present invention employs: a signal line along which a bit array including a plurality of bits used for expressing information on one of absolute positions shifted from each other in a direction determined in advance is created repeatedly in the direction determined in advance; and an information reading-out section for reading out the information expressed by the bits from the signal line.

Every time a pulse signal determined in advance is supplied to the driving section determined in advance, the information reading-out section is driven to make a movement relative to the signal line in the direction determined in advance by a distance corresponding to the pitch of the bits included in the bit array. At an absolute-position acquisition point on the signal line, the information reading-out section reads out information expressed by the bits included in the bit array as the information on the absolute position of the absolute-position acquisition point from the signal line.

Information on a position relative to the absolute-position acquisition point is acquired by the information reading-out section by counting the number of aforementioned pulse signals supplied to the driving section determined in advance.

As a result, the position detection apparatus according to the embodiment allows the number of signal lines to be reduced and is capable of preventing the resolution of the lens-position detection from deteriorating.

A position detection apparatus provided in accordance with the second embodiment of the present invention employs: a first signal line along which a first bit array including a plurality of bits used for expressing information on one of absolute positions shifted from each other in a direction determined in advance is created repeatedly in the direction determined in advance; a second signal line along which a second bit array associated with the first bit array is created repeatedly in the direction determined in advance; and an information reading-out section which is capable of making a movement relative to the first and second signal lines in the direction determined in advance and is used for concurrently reading out pieces of information expressed by the bits included in the first and second bit arrays from the first and second signal lines respectively.

At an absolute-position acquisition point on the first signal line, the information reading-out section reads out information expressed by the bits included in the first bit array as the information on the absolute position of the absolute-position acquisition point from the first signal line.

Information on a position relative to the absolute-position acquisition point is acquired by the information reading-out section from the second signal line as a bit count obtained by counting the number of bits included in the second bit array as bits corresponding to the position relative to the absolute-position acquisition point.

As a result, the position detection apparatus according to the embodiment allows the number of signal lines to be reduced and is capable of preventing the resolution of the lens-position detection from deteriorating.

DETAILED DESCRIPTION OF THE PREFERRED EMBODIMENTS

First Embodiment

[Configuration of Main Sections of the Camera System]

Figure 1:
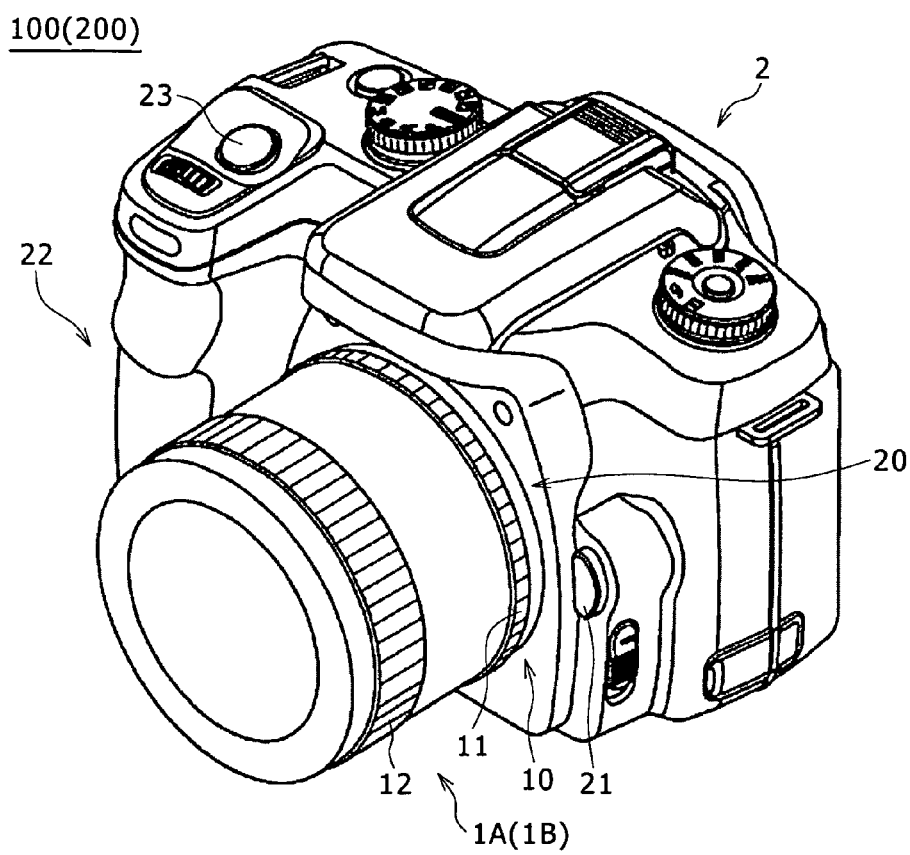
FIG. 1 is a perspective-view diagram showing an external-appearance configuration of a camera system according to a first embodiment of the present invention.

FIG. 1 is a perspective-view showing an external-appearance configuration of a camera system 100 according to a first embodiment of the present invention.

The camera system 100 serving as an image taking apparatus is typically configured to function as a digital still camera of a single-lens reflex type. The camera system 100 has such a configuration that a replacement lens unit 1A can be mounted on and dismounted from a camera body 2 with a high degree of freedom. The camera body 2 has a mount section 20 at the center of the front surface of the camera body 2. On the mount section 20, the replacement lens unit 1A is mounted. In addition, the camera body 2 also includes a lens replacement button 21 on the right horizontal side of the mount section 20. On top of that, the camera body 2 also employs a shutter button 23 on the top surface of a grip section 22 which is grabbed by the user.

The replacement lens unit 1A also referred to simply as a replacement lens functions as a lens window for receiving light (or an optical image) from an image taking object. The replacement lens unit 1A is also configured to serve as an image taking optical system for guiding the light (or the optical image) received from the image taking object to an image taking device which is located in the inside of the camera body 2. The replacement lens unit 1A also has a mount section 10 on the rear side of the replacement lens unit 1A. The mount section 10 is engaged with the mount section 20 of the camera body 2. The replacement lens unit 1A already mounted on the mount section 20 can be taken off from the camera body 2 by carrying out an operation to press the lens replacement button 21.

Figure 2:
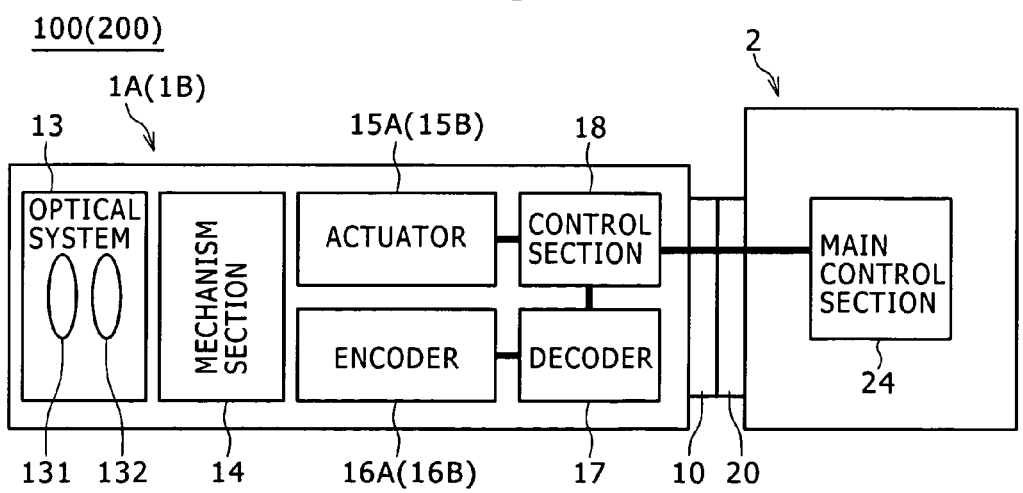
FIG. 2 is a block diagram showing a functional configuration of the camera system.

The replacement lens unit 1A has a lens group including a plurality of lenses which are provided in a series arrangement along the optical axis of the replacement lens unit 1A. The lenses of the lens group include a focus lens 131 and a zoom lens 132 which are shown in FIG. 2. The focus lens 131 and the zoom lens 132 can be moved by a lens movement mechanism provided on a mechanism section 14 in the direction of the optical axis. The mechanism section 14 is also shown in FIG. 2. The focus lens 131 is configured to function as a lens, the focal point of which is to be adjusted. On the other hand, the zoom lens 132 is configured to function as a lens, the magnification of which is to be varied. To put it in detail, the focal point of the focus lens 131 is adjusted by moving the focus lens 131 in the direction of the optical axis. By the same token, the magnification of the zoom lens 132 is varied by moving the zoom lens 132 in the direction of the optical axis.

In addition, the replacement lens unit 1A is also provided with a focus ring 11 and a zoom ring 12. Each of the focus ring 11 and the zoom ring 12 has a ring shape which can be rotated over the outer surface of the cylindrical body of the replacement lens unit 1A in a direction surrounding the body. The focus ring 11 is configured to serve as an operation input member to be rotated by the user in order to move the focus lens 131 shown in FIG. 2 along the optical axis of the replacement lens unit 1A. By the same token, the zoom ring 12 is configured to serve as an operation input member to be rotated by the user in order to move the zoom lens 132 shown in FIG. 2 along the optical axis of the replacement lens unit 1A. In this case, the focus lens 131 and/or the zoom lens 132 are moved along the optical axis of the replacement lens unit 1A in accordance with the rotation direction and rotation quantity of a manual operation carried out by the user or an auto operation carried out by an actuator 15A also shown in FIG. 2.

[Functional Configuration of the Camera System 100]

FIG. 2 is a block diagram showing a functional configuration of the camera system 100. In the functional configuration shown in FIG. 2, members identical with their counterparts employed in the configuration shown in FIG. 1 are denoted by the same reference numerals as the counterparts.

As shown in FIG. 2, the replacement lens unit 1A employs an optical system 13 and a mechanical mechanism section 14. The optical system 13 includes the group of lenses and a diaphragm. As described earlier, the group of lenses has the focus lens 131 and the zoom lens 132 which are held by the mechanism section 14. The mechanism section 14 is a section for driving components such as the group of lenses. In addition, the replacement lens unit 1A employs the actuator 15A cited above, a distance encoder 16A, a decoder 17 and a control section 18. The actuator 15A is a section for driving the focus lens 131 and the zoom lens 132 in the direction of the optical axis. The distance encoder 16A is a section for detecting the positions of lenses including the focus lens 131. In the following description, the distance encoder 16A is also referred to simply as an encoder. The decoder 17 is a section for decoding a signal output by the distance encoder 16A. The control section 18 is electrically connected to the actuator 15A and the decoder 17 to serve as a controller for controlling the actuator 15A and the decoder 17.

The actuator 15A is configured to function as typically a DC servo motor.

The distance encoder 16A is configured to function as a position detection sensor or a position detection unit. To be more specific, the distance encoder 16A detects the positions of the focus lens 131 and the zoom lens 132 which are held by the mechanism section 14. Then, the distance encoder 16A outputs position detection signals representing the detected positions to the decoder 17.

The control section 18 typically employs components including a CPU, a ROM and a RAM. The components employed by the control section 18 serve as a microcomputer. That is to say, the control section 18 is a member for controlling other sections employed in the replacement lens unit 1A in an across-the-board manner. In addition, the control section 18 has a communication function for carrying out communications with a main control section 24 employed in the camera body 2. To put it more concretely, the control section 18 transmits various kinds of data to the main control section 24 and receives data such as a driving quantity of the focus lens 131 from the main control section 24. The data transmitted by the control section 18 to the main control section 24 typically includes focal-point distances of lenses included in the group of lenses, the position of an exit pupil, a diaphragm value, an in-focus distance and the amount of light coming from the surrounding environment.

Figure 3:
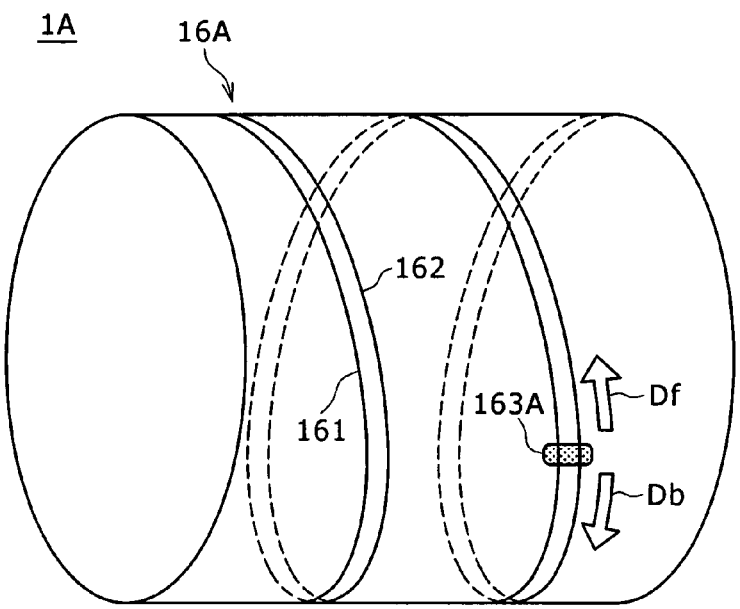
FIG. 3 is an explanatory diagram to be referred to in description of the configuration of an encoder employed in the camera system.

Next, the configuration of the distance encoder 16A is explained by referring to FIG. 3.

[Configuration of the Distance Encoder 16A]

FIG. 3 is an explanatory diagram to be referred to in description of the configuration of the distance encoder 16A.

As shown in the figure, the distance encoder 16A has two signal lines and a magnetic sensor section 163A. In the following description, the two signal lines are also referred to as a first signal line 161 and a second signal line 162 respectively. Each of the first and second signal lines 161 and 162 has the shape of a spiral wound over the surface of the cylindrical body of the replacement lens unit 1A to surround the cylindrical body. The magnetic sensor section 163A is moved over the first and second signal lines 161 and 162 in a forward direction Df approaching the replacement lens unit 1A or a backward direction Db bearing away from the replacement lens unit 1A in a manner of being interlocked with the focus lens 131 and/or the zoom lens 132.

The two signal lines (that is, the first and second signal lines 161 and 162) are configured as encoder plates parallel to each other. A code pattern is created to generate a magnetic signal at a constant pitch.

Figure 4:
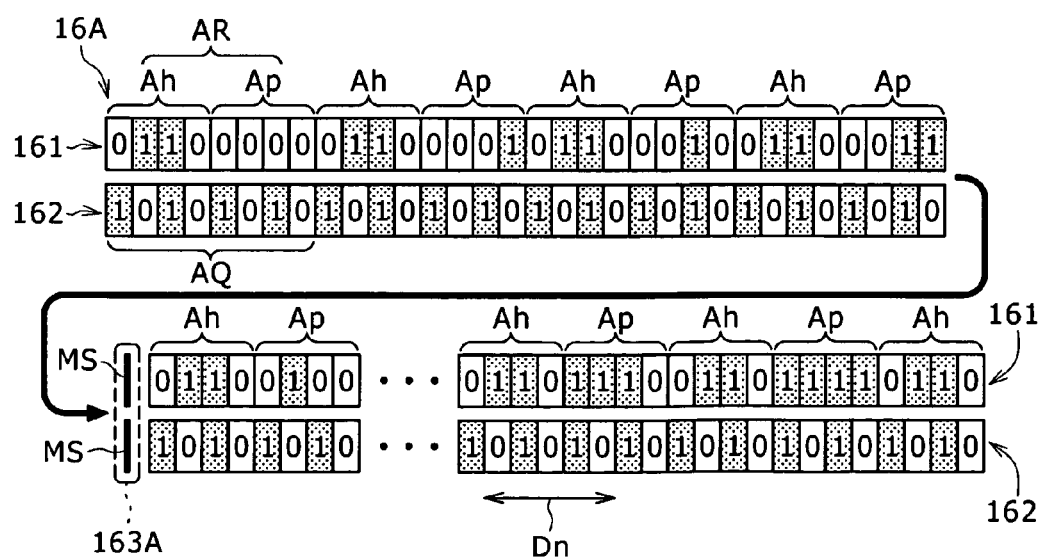
FIG. 4 is an explanatory diagram to be referred to in description of the configurations of signal lines employed in the encoder.

As shown in FIG. 4, the magnetic sensor section 163A has two MR (Magnetic Resistant) sensors MS for reading out magnetic signals from the first and second signal lines 161 and 162 respectively. As described above, the magnetic sensor section 163A is moved in a manner of being interlocked with sections such as the focus lens 131 and/or the zoom lens 132.

In the distance encoder 16A having the configuration described above, the position of the magnetic sensor section 163A is detected as a position relative to the first and second signal lines 161 and 162. Thus, the positions of lenses including the focus lens 131 can be detected. The configurations of the first and second signal lines 161 and 162 are explained in detail as follows.

FIG. 4 is an explanatory diagram to be referred to in description of the configurations of the first and second signal line 161 and 162. In the diagram of FIG. 4, each of the first and second signal lines 161 and 162 each having a shape of a spiral as shown in FIG. 3 is expanded on a planar surface to form a straight line. That is to say, FIG. 4 is a diagram showing a code pattern of each of the first and second signal lines 161 and 162. It is to be noted that, for the sake of convenience in drawing the diagram, each of the first and second signal lines 161 and 162 is shown in upper and lower sub-diagrams. As indicated by an arrow shown in FIG. 4, the tail of a portion shown in the upper sub-diagram is linked to the head of a portion shown in the lower sub-diagram. In addition, in the diagram of FIG. 4, an H (high) magnetic signal detected by the magnetic sensor section 163A is expressed by a "1" bit whereas an L (low) magnetic signal detected by the magnetic sensor section 163A is expressed by a "0" bit.

Each of the first and second signal lines 161 and 162 which are extended in parallel to each other is created by dividing each of the first and second signal lines 161 and 162 into a magnet attracting portion and a non magnet attracting portion through the use of typically a printing technology. Thus, each of the H and L magnetic signals can be recognized.

On the first signal line 161, a bit array AR expressing information on an absolute position in the line direction Dn of the first signal line 161 in terms of 8 bits is created repeatedly in the line direction Dn. In the following description, the bit array AR is also referred to as a first bit array. The first bit array AR is configured to include a header portion Ah having 4 bits and a real data portion Ap also having 4 bits. The header portion Ah and the real data portion Ap are arranged alternately along the first signal line 161. The header portion Ah is a fixed code pattern including 4 bits which are L, H, H and L bits respectively. The header portion Ah serves as an identification signal used for recognizing the header portion Ah represented by the code pattern. That is to say, the header portion Ah is a code pattern determined in advance to serve as a pattern giving information on timings to start and stop an operation to fetch absolute-position information described in the real data portion Ap. On the other hand, the real data portion Ap is data of any combination of 4 bits except the L, H, H and L bits of the header portion Ah. Concrete examples of the combination of 4 bits in the real data portion Ap are bit data such as L, L, L and L bits, L, L, L and H bits, L, L, H and L bits and so on. The bit data is included in the real data portion Ap to represent information on an absolute position. That is to say, the real data portion Ap describes the aforementioned information on an absolute position. With the configuration described above as the configuration of the first bit array AR, the absolute-position information can be described properly on the first signal line 161 as serial data. It is to be noted that, as described above, the combinations of 4 bits in the real data portion Ap do not include the L, H, H and L bits which are allocated to the header portion Ah. That is to say, each of the combinations of 4 bits in the real data portion Ap is configured to have bit data which is different from the bit data for the header portion Ah. This is because it is desirable to prevent real data included in the real data portion Ap from being detected as the header portion Ah and the header portion Ah from being detected as real data included in the real data portion Ap.

By the same token, on the second signal line 162, a bit array AQ expressing information on a relative position in the line direction Dn of the second signal line 162 in terms of bits is created repeatedly in the line direction Dn. The relative position will be described later in detail. In the following description, the bit array AQ is also referred to as a second bit array. The number of bits included in the second bit array AQ is the same as the number of bits included in the first bit array AR created on the first signal line 161. In addition, every bit included in the second bit array AQ is synchronized with its corresponding bit included in the bit array AR. Magnetic signals H and L are repeated along the second signal line 162 in the line direction Dn so that the magnetic sensor section 163A reads out "1" and "0" bit information alternately from the second signal line 162.

From the first and second signal lines 161 and 162 having the configuration described above, the magnetic sensor section 163A serving as an information reading-out section capable of moving relatively to the first and second signal lines 161 and 162 in the line direction Dn is capable of reading out bit information concurrently. The following description explains a technique for detecting the current position of the magnetic sensor section 163A on the two signal lines by using the bit information read out from the first and second signal lines 161 and 162.

The actuator 15A drives a lens such as the focus lens 131 to move in a manner of being interlocked with the magnetic sensor section 163A. The magnetic sensor section 163A detects the L, H, H and L identification signal included in the header portion Ah from the first signal line 161 and reads out absolute-position information included in the real data portion Ap which is located between two adjacent head portions Ap. Thus, the magnetic sensor section 163A is capable of detecting the absolute position of the magnetic sensor section 163A by using the first signal line 161. Since the magnetic sensor section 163A detects the absolute position of the magnetic sensor section 163A at intervals of 8 bits, however, the precision of the detection is not high.

In order to solve the problem of the low detection precision, in this embodiment, an accurate absolute position of the magnetic sensor section 163A is found by interpolation carried out on two consecutive pieces of absolute-position information which is read out from the first signal line 161. The interpolation is carried out by using relative-position information which is read out from the second signal line 162 with a relatively high degree of precision. To put it more concretely, the two consecutive pieces of absolute-position information read out from the first signal line 161 are first absolute-position information and second absolute-position information which are separated away from each other by an interval having a length of 8 bits. During the interval having a length of 8 bits, pieces of relative-position information are also acquired from the second signal line 162 as bit counts (or pulse counts) output by the magnetic sensor section 163A which is placed also on the second signal line 162. The bit count is obtained by carrying out an operation to count the number of bits on the second signal line 162. In this case, the operation to count the number of bits on the second signal line 162 is begun at the start of the interval and stopped at the end of the interval. The start of the interval is a time at which the first absolute-position information is read out from the first signal line 161 whereas the end of the interval is a time at which the second absolute-position information is read out from the first signal line 161. Then, the relative-position information acquired from the second signal line 162 at a particular time in the interval is added to the first absolute-position information read out from the first signal line 161 in order to result in information on the accurate absolute position of the magnetic sensor section 163A for the particular time. In actuality, the relative-position information acquired from the second signal line 162 at the present time is added to the absolute-position information read out last from the first signal line 161 in order to result in accurate information on the present absolute position of the magnetic sensor section 163A. Thus, by merely providing only the two signal lines 161 and 162, it is possible to detect the present position of a lens, which is moving in a manner of being interlocked with the magnetic sensor section 163A, with a high degree of precision.

The position detection based on the first and second signal lines 161 and 162 is carried out in an outward movement of the magnetic sensor section 163A over the first and second signal lines 161 and 162 in a way different to a certain degree from the way in which the position detection is carried out in a return movement of the magnetic sensor section 163A. That is to say, the position detection based on the first and second signal lines 161 and 162 is carried out in a forward direction Df shown in FIG. 3 in a way different to a certain degree from the way in which the position detection is carried out in a backward direction Db shown in the same diagram. The differences are explained below. It is to be noted that control information output by the control section 18 for controlling operations such as an operation to change the rotational direction of the actuator 15A can be used for identifying the movement direction of the magnetic sensor section 163A. As an alternative, the 4-bit pattern read out from the second signal line 162 at the same time as the header portion Ah read out from the first signal line 161 can also be used for identifying the movement direction of the magnetic sensor section 163A. To put it more concretely, the 4-bit pattern read out from the second signal line 162 is examined to determine whether the 4-bit pattern is H, L, H and L or L, H, L and H so as to identify the movement direction of the magnetic sensor section 163A.

Figure 5:
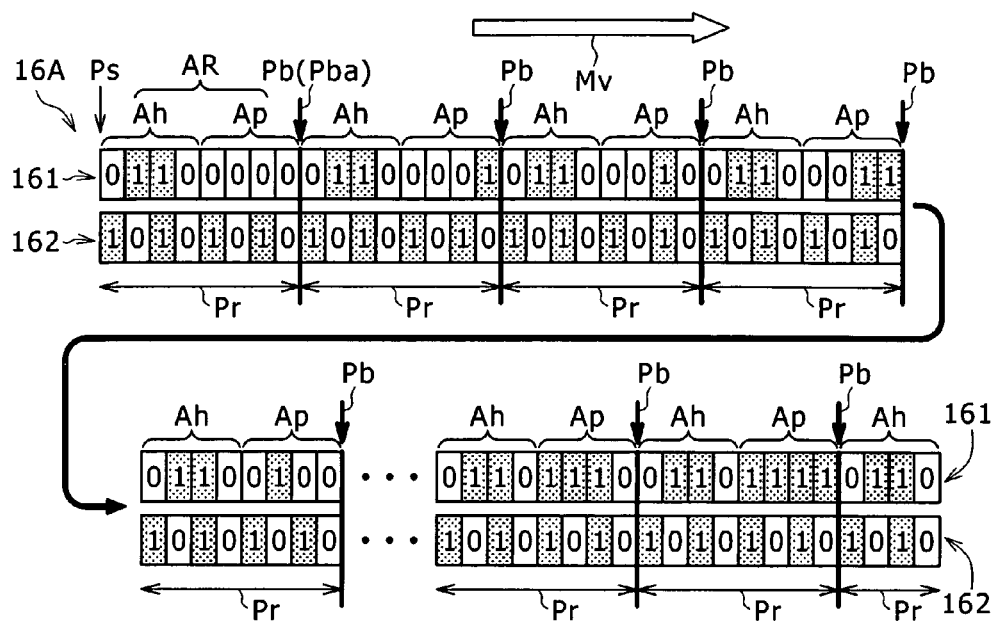
FIG. 5 is an explanatory diagram to be referred to in description of lens-position detection carried out by the encoder.

First of all, in the outward movement of the magnetic sensor section 163A over the first and second signal lines 161 and 162, the magnetic sensor section 163A moves in a direction from the start points of the first and second signal lines 161 and 162 to the tails of the first and second signal lines 161 and 162. In FIG. 5, the start points are pointed to by an arrow Ps. An absolute-position detection point Pb shown in the same diagram is a point right after the magnetic sensor section 163A has sequentially read out the identification signal of L, H, H and L serving as a header portion Ah of the first signal line 161 and, then, 4-bit data of the real data portion Ap from the first signal line 161. In addition, during an interval Pr flanked by two adjacent absolute-position detection points Pb corresponding to two consecutive absolute positions respectively, the magnetic sensor section 163A also reads out additional information on a relative position between the two consecutive absolute positions from the second signal line 162. Then, the additional information on a relative position between the two consecutive absolute positions is added to the earlier one of the two consecutive absolute positions in order to find the present position of the magnetic sensor section 163A with a high degree of precision.

To put it more concretely, for example, the magnetic sensor section 163A is moved in the backward direction Db from the position Ps of the start points in an outward movement. In this outward movement, the magnetic sensor section 163A detects a signal array of L, H, H, L, L, L, L and L. After the first half of L, H, H and L of the signal array is detected, an operation to read out information on an absolute position from the real data portion Ap is started. The second half of L, L, L and L of the signal array is the absolute-position information read out from the real data portion Ap. In this case, the absolute-position information read out from the real data portion Ap is the information on the absolute position of the first absolute-position detection point Pba. Then, the outward movement is continued in the backward direction Db from the absolute position of the first absolute-position detection point Pba by a distance corresponding to 3 bits for example. During this continuation of the outward movement, bits read out from the second bit array AQ of the second signal line 162 are detected and the number of detected bits is counted in order to find a bit count. Then, the movement distance indicated by the bit count which is 3 in this case is added to the absolute position of the first absolute-position detection point Pba in order to find the present position of a lens, which is moving in a manner of being interlocked with the magnetic sensor section 163A, with a high degree of precision.

In the return movement of the magnetic sensor section 163A over the first and second signal lines 161 and 162, on the other hand, the magnetic sensor section 163A moves in a direction from the tails of the first and second signal lines 161 and 162 to the start points of the first and second signal lines 161 and 162. In a diagram of FIG. 6, the tails of the first and second signal lines 161 and 162 are pointed to by an arrow Pt. In the same diagram, an absolute-position detection point Pb is a point right after the magnetic sensor section 163A has sequentially read out the identification signal of L, H, H and L serving as a header portion Ah of the first signal line 161 and, then, 4-bit data of the real data portion Ap from the first signal line 161. For every absolute-position detection point Pb, the magnetic sensor section 163A acquires such 4-bit data serving as information on the absolute position of the absolute-position detection point Pb. In addition, during an interval Pr flanked by two adjacent absolute-position detection points Pb corresponding to two consecutive absolute positions respectively, the magnetic sensor section 163A reads out additional information on a relative position between the two consecutive absolute positions from the second signal line 162. Then, the additional information on a relative position between the two consecutive absolute positions is subtracted from the earlier one of the two consecutive absolute positions in order to find the present position of the magnetic sensor section 163A with a high degree of precision.

To put it more concretely, for example, the magnetic sensor section 163A is moved in the forward direction Df from the position Pt of the tails of the first and second signal lines 161 and 162 in a return movement. In this return movement, the magnetic sensor section 163A detects a signal array of L, H, H, L, H, H and H. After the first half of L, H, H and L of the signal array is detected, an operation to read out information on an absolute position from the real data portion Ap is started. The second half of H, H, H and H of the signal array is the absolute-position information read out from the real data portion Ap. In this case, the absolute-position information read out from the real data portion Ap is the information on the absolute position of the first absolute-position detection point Pbb. Then, the return movement is continued in the forward direction Df from the absolute position of the first absolute-position detection point Pbb by a distance corresponding to 3 bits for example. During this continuation of the return movement, bits read out from the second bit array AQ of the second signal line 162 are detected and the number of detected bits is counted in order to find a bit count. Then, the movement distance indicated by the bit count which is 3 in this case is subtracted from the absolute position of the first absolute-position detection point Pbb in order to find the present position of a lens, which is moving in a manner of being interlocked with the magnetic sensor section 163A, with a high degree of precision.

Figure 6:
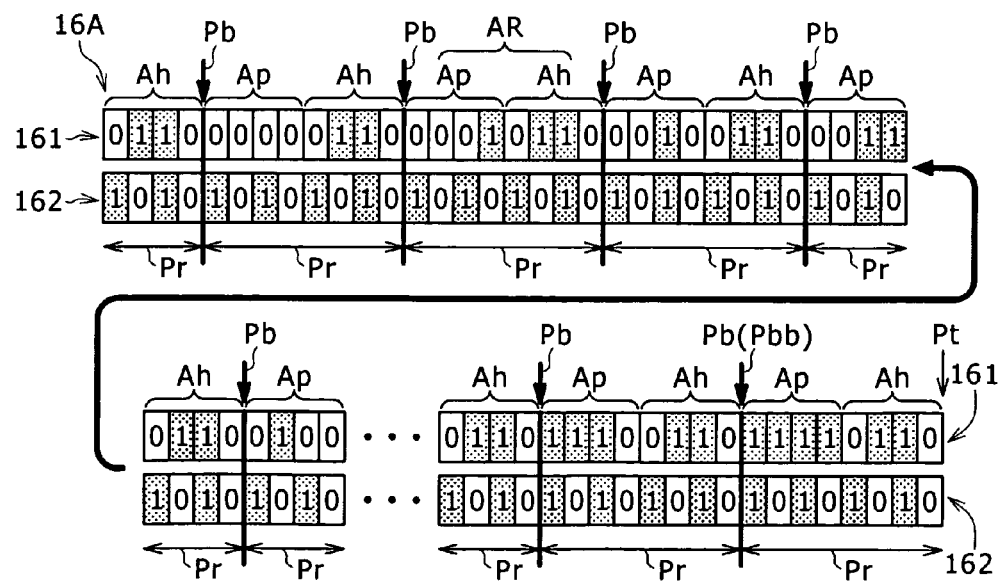
FIG. 6 is an explanatory diagram to be referred to in description of lens-position detection carried out by the encoder.

As is obvious from comparison of FIG. 5 with FIG. 6, an absolute-position detection point Pb in the outward movement over the first signal line 161 is shifted from the corresponding absolute-position detection point Pb in the return movement over the first signal line 161 by a distance of 4 bits included in a real data portion Ap. It is thus desirable to provide a configuration in which bit arrays each representing an absolute-position detection point Pb in the outward movement are stored in an outward-movement data table different from a return-movement data table used for storing bit arrays each representing an absolute-position detection point Pb in the return movement. Typically, the outward-movement data table and the return-movement data table are stored in advance in a ROM which is employed in the control section 18. By having such a configuration, proper position detections for respectively the outward movement and the return movement over the first signal line 161 can be carried out with ease. It is to be noted that, in an alternative configuration, the first signal line 161 is configured so that every bit array used in the outward movement represents the same absolute position as the corresponding bit array used in the return movement. In the case of this alternative configuration, the outward movement and the return movement share one data table common to the outward movement and the return movement. The bit array used in the alternative configuration is referred to as a palindromic bit array.

It is to be noted that, in order to obtain information on an absolute position from the first signal line 161, the magnetic sensor section 163A must move by a distance of at least 8 bits. A typical example of the movement of the magnetic sensor section 163A is a movement My which is stretched to include the absolute positions of two successive absolute-position detection points Pb as shown in FIG. 5. The movement can be carried out by the magnetic sensor section 163A as a movement indispensable to such detection of an absolute position after the AF control is executed. It is desirable, however, to move the magnetic sensor section 163A after driving the actuator 15A when the replacement lens unit 1A is mounted on the mount section 20 in initial processing of the replacement lens unit 1A prior to the AF control. It is to be noted that this initial processing is also referred to as an initial operation. Thus, by using absolute-position information already acquired in the initial processing of the replacement lens unit 1A along with information on a phase, in the AF control, the distance encoder 16A is capable of detecting the present positions of lenses including the focus lens 131 in a short period of time.

In the distance encoder 16A employed in the camera system 100 described above, the magnetic sensor section 163A acquires information on an absolute position for each of absolute-position detection points Pb which appear on the first signal line 161 at intervals Pr each having a length of 8 bits as shown in FIGS. 5 and 6. In addition, the magnetic sensor section 163A acquires information on relative positions for each interval Pr, which is flanked by two successive detection points Pb as shown in FIGS. 5 and 6, from the second signal line 162. The second signal line 162 is a signal line on which magnetic signals of H and L are repeated. The magnetic sensor section 163A acquires information on a relative position for the present time by counting the number of magnetic signals detected since the start of the interval Pr till the present time. Thus, the present invention offers a merit that, in the distance encoder 16A, the number of signal lines can be sustained at a small value and, at the same time, the resolution of the position detection can be prevented from deteriorating.

Second Embodiment

[Configuration of Main Sections of the Camera System]

A camera system 200 according to a second embodiment of the present invention has a configuration similar to the configurations shown in FIGS. 1 and 2 as the configurations of the camera system 100 according to the first embodiment of the present invention. However, the configurations of an actuator 15B and a distance encoder 16B which are employed in a replacement lens unit 1B for the camera system 200 are different from respectively the configurations of the actuator 15A and the distance encoder 16A which are employed in the replacement lens unit 1A for the camera system 100 described earlier. By referring to explanatory diagrams of FIGS. 7A, 7B and 8, the following description explains the configurations of the actuator 15B and the distance encoder 16B which are employed in the replacement lens unit 1B for the camera system 200 according to the second embodiment.

Figure 7A:
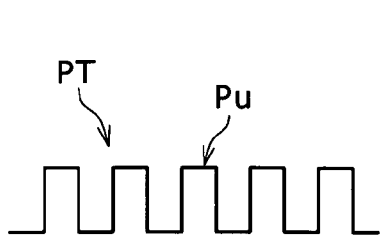
FIGS. 7A and 7B are explanatory diagrams to be referred to in description of the configuration of an actuator employed in a camera system according to a second embodiment of the present invention.
Figure 7B:
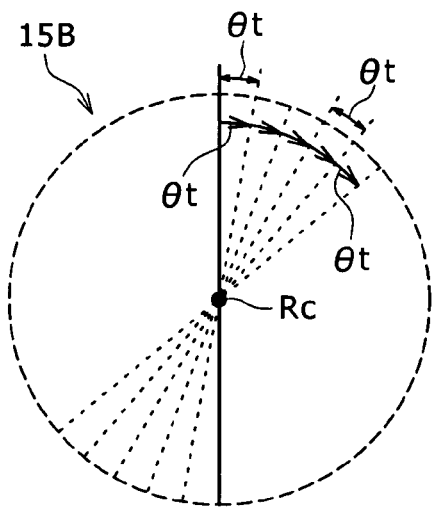

FIGS. 7A and 7B are explanatory diagrams to be referred to in description of the configuration of the actuator 15B.

The actuator 15B according to the second embodiment is implemented as a stepping motor. When the actuator 15B is driven by a pulse train PT shown in FIG. 7A for example, for every pulse Pu of the pulse train PT, the actuator 15B makes a rotation Qt over a certain angle around a rotational axis Rc as shown in FIG. 7B. The actuator 15B sequentially makes such rotations Qt for a sequence of pulses Pu in the pulse train PT. That is to say, when the actuator 15B is driven by a pulse Pu, the actuator 15B makes a rotation Qt over a certain angle θt around a rotational axis Rc as shown in FIG. 7B.

Figure 8:
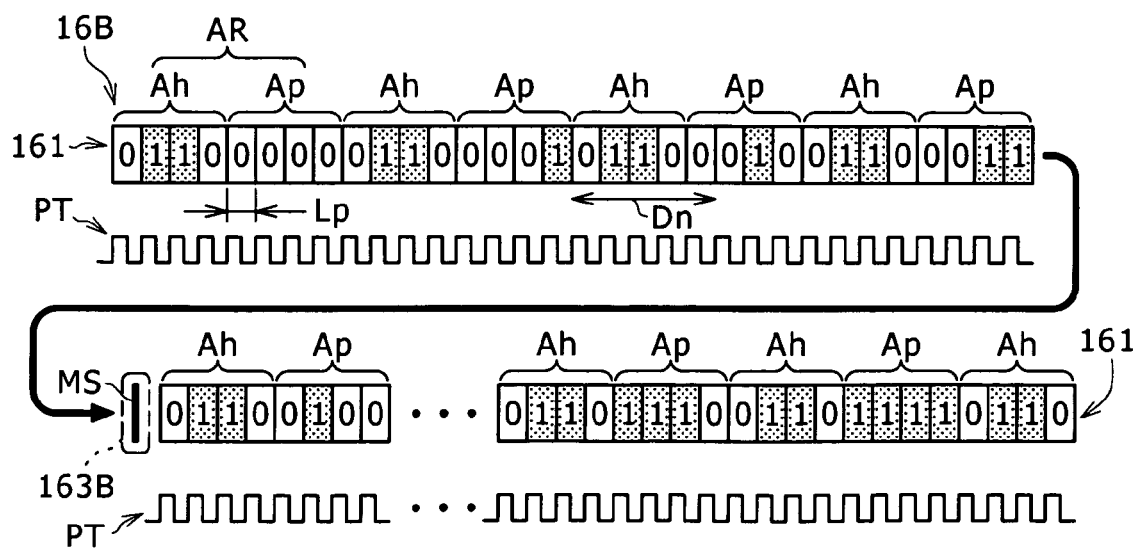
FIG. 8 is an explanatory diagram to be referred to in description of the configuration of an encoder employed in the camera system according to the second embodiment.

Next, the configuration of the distance encoder 16B is explained by referring to a diagram of FIG. 8.

[Configuration of the Distance Encoder 16B]

FIG. 8 is an explanatory diagram to be referred to in description of the configuration of the distance encoder 16B.

The distance encoder 16B according to the second embodiment is different from the distance encoder 16A shown in FIG. 4 to serve as the encoder according to the first embodiment in that the distance encoder 16B does not have the second signal line 162 employed in the distance encoder 16A. That is to say, the distance encoder 16B includes only the first signal line 161 which has the same configuration as the first signal line 161 employed in the first embodiment. Thus, the magnetic sensor section 163B employed in the second embodiment includes only one magnetic resistor MS for reading out magnetic signals from the first signal line 161.

The pitch Lp of bits on the first signal line 161 is set at a value equal to a distance by which the magnetic sensor section 163B is moved in a manner of being interlocked with the lenses including the focus lens 131 when the actuator 15B is rotated by the angle θt due to one pulse Pu supplied to the actuator 15B. The pitch Lp of bits on the first signal line 161 is equal to the width of every bit. That is to say, every time a pulse Pu is supplied to the actuator 15B which serves as driving means, the magnetic sensor section 163B is driven to move over the first signal line 161 relatively to the first signal line 161 in a line direction Dn by a movement distance corresponding to the pitch Lp of the bits of the bit array AR on the first signal line 161.

In other words, on the first signal line 161, bit arrays AR having a bit pitch Lp corresponding to a step width are created. The step width is equal to the aforementioned movement distance by which the magnetic sensor section 163B is moved when one input pulse Pu is supplied to the actuator 15B to serve as a pulse for driving the distance encoder 16B to move the magnetic sensor section 163B. In the following description, the step width is also referred to as a driving step width. It is to be noted that the ratio of a gear locked and linked to the actuator 15B can be adjusted. By adjusting the gear ratio, the pitch Lp of bits on the first signal line 161 can be made equal to the driving step width of the magnetic sensor section 163B.

The following description explains a technique for detecting the present position of the magnetic sensor section 163B moving in a manner of being interlocked with lenses including the focus lens 131 in the camera system 200 provided with the actuator 15B and the distance encoder 16B which have the configurations described above.

In the replacement lens unit 1B of the camera system 200, in the same way as the first embodiment, the magnetic sensor section 163B acquires information on its absolute position from the first signal line 161 at absolute-position detection points which are separated away from each other by an interval having a length of 8 bits. The absolute-position detection point at which the information on an absolute position is acquired from the first signal line 161 corresponds to the absolute-position detection point Pb shown in FIGS. 5 and 6. That is why the absolute-position detection point is also referred to as an absolute-position acquisition point. In addition, the relative position of the magnetic sensor section 163B is found as a position relative to an absolute-position detection point for each of the absolute-position detection points on the basis of a pulse count which is obtained by counting the number of pulses Pu included in the pulse train PT supplied to the actuator 15B. That is to say, since the pitch Lp of bits on the first signal line 161 is made equal to the driving step width of the magnetic sensor section 163B of the distance encoder 16B driven by the actuator 15B, the movement distance of the magnetic sensor section 163B can be found by starting the operation to count the number of pulses included in the pulse train PT supplied to the actuator 15B at a point of time at which the absolute position of the absolute-position detection point is detected from the first signal line 161. The movement distance of the magnetic sensor section 163B is a distance by which the magnetic sensor section 163B is moved from an absolute-position detection point having its absolute position detected from the first signal line 161. The movement distance of the magnetic sensor section 163B is the aforementioned relative position of the magnetic sensor section 163B. As described above, the magnetic sensor section 163B acquires information on its absolute position from the first signal line 161 at absolute-position detection points which are separated away from each other by an interval having a length of 8 bits and, in addition, the relative position of the magnetic sensor section 163B is found for each of the absolute-position detection points on the basis of a pulse count which is obtained by counting the number of pulses Pu included in the pulse train PT supplied to the actuator 15B. Thus, by adding the relative position found for an absolute-position detection point to the absolute position of the absolute-position detection point, it is possible to detect the present absolute position of a lens, which is moved in a manner of being interlocked with the magnetic sensor section 163B, with a high degree of precision.

As described above, the magnetic sensor section 163B of the distance encoder 16B employed in the camera system 200 explained before acquires information on its absolute position from the first signal line 161 at absolute-position detection points which are separated away from each other by an interval having a length of 8 bits and, in addition, during an interval flanked by every two adjacent absolute-position detection points each having its absolute position detected from the first signal line 161, the relative position of the magnetic sensor section 163B is found for each of the absolute-position detection points on the basis of a pulse count which is obtained by counting the number of pulses Pu included in the pulse train PT supplied to the actuator 15B. Thus, the present invention offers a merit that, in the distance encoder 16B, the number of signal lines can be sustained at a small value and, at the same time, the resolution of the position detection can be prevented from deteriorating. It is to be noted that the interval cited above corresponds to the interval Pr shown in FIGS. 5 and 6.

<Modified Versions>

In the first signal line 161 used in the first and second embodiments, it is not necessary to configure each of the header portion Ah and the real data portion Ap as a portion which always includes 4 bits. For example, each of the header portion Ah and the real data portion Ap can also be configured as a portion which includes 5 or more bits. As another typical alternative, the number of bits included in the real data portion Ap can be set at an integer greater than the number of bits which are included in the header portion Ah.

The distance encoder 16A of the first embodiment and the distance encoder 16B of the second embodiment do not have to be absolutely encoders of the magnetic type. For example, the distance encoder 16A (16B) can also be an encoder of the optical type. As another typical alternative, the distance encoder 16A (16B) can also be an encoder which has an encoder brush brought into contact with the signal lines.

In the case of the first embodiment described above, it is not necessary to set the pitch of the bits on the second signal line 162 always at a value equal to the pitch of the bits on the first signal line 161. For example, the pitch of the bits on the second signal line 162 can also be set at a value which is (1/n) times the pitch of the bits on the first signal line 161 where n≥2. By the same token, in the case of the second embodiment described above, it is not necessary to set the driving step width of the magnetic sensor section 163B explained earlier always at a value equal to the pitch Lp of the bits on the first signal line 161. For example, the driving step width of the magnetic sensor section 163B can also be set at a value which is (1/n) times the pitch Lp of the bits on the first signal line 161 where n≥2. This led the relative position to be found with an even higher degree of precision. Thus, the precision of the lens-detection detection carried out by the distance encoders 16A and 16B moving the magnetic sensor sections 163A and 163B respectively can be further improved.

It is not necessary to provide the actuator 15A (15B) always inside the replacement lens unit 1A (1B). For example, the actuator can also be set inside the camera body 2. In this case, the lenses included in the replacement lenses are driven through a coupler.

The camera system 100 (200) is by no means a digital camera. For example, the camera system 100 (200) can also be a film camera which makes use of a silver salt film.

It is not necessary to make use of the distance encoder 16A (16B) to detect the positions of lenses in the replacement lens unit 1A (1B). For example, it is also possible to make use of the distance encoder 16A (16B) to detect the position of an unreplacable fixed image taking lens also referred to as a fixed image taking lens which cannot be removed from the image taking apparatus. In addition, instead of using the distance encoder 16A (16B) to detect the positions of lenses in the replacement lens unit 1A and the replacement lens unit 1B respectively, the distance encoder 16A (16B) can also be used to detect the position and rotational angle of a paper feeding motor which is employed in a printer.

The decoder 17 employed in each of the first and second embodiments can be configured to make use of a UART (Universal Asynchronous Receiver Transmitter) or an NZR (Non-Return-to-Zero).

It is not necessary to apply the present invention always to a linear encoder. For example, it is also possible to apply the present invention to a rotary encoder.

Details of the present invention have been explained so far. However, the explained details of the present invention are typical in every aspect. That is to say, implementations of the present invention are by no means limited to the explained details. Thus, an infinite number of modified versions not explained in this invention specification can each be assumed to be an implementation of the present invention as long as the modified versions do not deviate from a range of essentials of the present invention.

It should be understood by those skilled in the art that various modifications, combinations, sub-combinations and alterations may occur depending on design requirements and other factor in so far as they are within the scope of the appended claims or the equivalents thereof.

What is claimed is:

1. A position detection apparatus comprising:
   a signal line along which a bit array including a plurality of bits used for expressing information on one of absolute positions in a direction determined in advance is created repeatedly in said direction determined in advance; and
   an information reading-out section which is capable of making a movement relative to said signal line in said direction determined in advance in accordance with a driving operation carried out by driving means determined in advance and is used for reading out said information expressed by said bits from said signal line, wherein
   every time a pulse signal determined in advance is supplied to said driving means determined in advance, said information reading-out section is driven to move over said signal line by a distance corresponding to the pitch of said bits included in said bit array;
   at an absolute-position acquisition point on said signal line, said information reading-out section reads out information expressed by a plurality of said bits as said information on said absolute position of said absolute-position acquisition point from said signal line; and
   information on a position relative to said absolute-position acquisition point is acquired by the information reading-out section by counting the number of said pulse signals supplied to said driving means determined in advance, and
   wherein said bit array comprises:
      a header portion created as a bit pattern determined in advance; and
      a real-data portion including bit data used for expressing said absolute position.

2. A position detection apparatus comprising:
   a first signal line along which a first bit array including a plurality of bits used for expressing information on one of absolute positions in a direction determined in advance is created repeatedly in said direction determined in advance;
   a second signal line along which a second bit array associated with said first bit array is created repeatedly in said direction determined in advance; and
   an information reading-out section which is capable of making a movement relative to said first and second signal lines in said direction determined in advance and is used for concurrently reading out pieces of information expressed by said bits from said first and second signal lines respectively, wherein at an absolute-position acquisition point on said first signal line, said information reading-out section reads out information expressed by a plurality of said bits as said information on said absolute position of said absolute-position acquisition point from said first signal line; and information on a position relative to said absolute-position acquisition point is acquired by said information reading-out section from said second signal line as a bit count obtained by counting the number of bits included in said second bit array as bits corresponding to said position relative to said absolute-position acquisition point.

3. The position detection apparatus according to claim 2 wherein said first bit array comprises:

a header portion created as a bit pattern determined in advance; and a real-data portion including bit data used for expressing said absolute position.

4. An image taking apparatus comprising:

a signal line along which a bit array including a plurality of bits used for expressing information on one of absolute positions in a direction determined in advance is created repeatedly in said direction determined in advance;

an information reading-out section which is capable of making a movement relative to said signal line in said direction determined in advance and is used for reading out said information expressed by said bits from said signal line; and driving means for driving said information reading-out section to move over said signal line by a distance corresponding to the pitch of said bits included in said bit array every time a pulse signal determined in advance is supplied to said driving means, wherein at an absolute-position acquisition point on said signal line, said information reading-out section reads out information expressed by a plurality of said bits as said information on said absolute position of said absolute-position acquisition point from said signal line; and information on a position relative to said absolute-position acquisition point is acquired by said information reading-out section by counting the number of said pulse signals supplied to said driving means determined in advance, wherein said bit array comprises:

a header portion created as a bit pattern determined in advance; and a real-data portion including bit data used for expressing said absolute position.

5. An image taking apparatus comprising:

a first signal line along which a first bit array including a plurality of bits used for expressing information on one of absolute positions in a direction determined in advance is created repeatedly in said direction determined in advance;

a second signal line along which a second bit array associated with said first bit array is created repeatedly in said direction determined in advance; and an information reading-out section which is capable of making a movement relative to said first and second signal lines in said direction determined in advance and is used for concurrently reading out pieces of information expressed by said bits from said first and second signal lines respectively, wherein at an absolute-position acquisition point on said first signal line, said information reading-out section reads out information expressed by a plurality of said bits as said information on said absolute position of said absolute-position acquisition point from said first signal line; and information on a position relative to said absolute-position acquisition point is acquired by said information reading-out section from said second signal line as a bit count obtained by counting the number of bits included in said second bit array as bits corresponding to said position relative to said absolute-position acquisition point.

6. A position detection method for driving an apparatus having a signal line along which a bit array including a plurality of bits used for expressing information on one of absolute positions in a direction determined in advance is created repeatedly in said direction determined in advance; and an information reading-out section which is capable of making a movement relative to said signal line in said direction determined in advance in accordance with a driving operation carried out by driving means determined in advance and is used for reading out said information expressed by said bits from said signal line, said position detection method comprising:

driving said information reading-out section to read out bit information from said signal line;

driving said information reading-out section to move over said signal line by a distance corresponding to the pitch of said bits included in said bit array every time a pulse signal determined in advance is supplied to said driving means determined in advance; and driving said information reading-out section to acquire information on a position relative to an absolute-position acquisition point, at which said information reading-out section reads out information expressed by a plurality of said bits on said signal line as information on the absolute position of said absolute-position acquisition point from said signal line, by counting the number of said pulse signals supplied to said driving means determined in advance, wherein said bit array comprises:

a header portion created as a bit pattern determined in advance; and a real-data portion including bit data used for expressing said absolute position.

7. A position detection method for driving an apparatus having a first signal line along which a first bit array including a plurality of bits used for expressing information on one of absolute positions in a direction determined in advance is created repeatedly in said direction determined in advance;

a second signal line along which a second bit array associated with said first bit array is created repeatedly in said direction determined in advance; and an information reading-out section which is capable of making a movement relative to said first and second signal lines in said direction determined in advance and is used for concurrently reading out pieces of information expressed by said bits from said first and second signal lines respectively, said position detection method comprising:

driving said information reading-out section to read out pieces of bit information concurrently from said first signal line and said second signal line; and driving said information reading-out section to acquire information on a position relative to an absolute-position acquisition point from said second signal line as a bit count obtained by counting the number of bits included in said second bit array as bits corresponding to said position relative to said absolute-position acquisition point at which said information reading-out section reads out information expressed by a plurality of said bits on said first signal line as information on the absolute position of said absolute-position acquisition point from said first signal line.

* * * * *